US012591755B2

(12) United States Patent
Sharma et al.

(10) Patent No.: US 12,591,755 B2
(45) Date of Patent: Mar. 31, 2026

(54) SYSTEM AND METHOD TO DYNAMICALLY MONITOR A SMART CARD

(71) Applicant: Bank of America Corporation, Charlotte, NC (US)

(72) Inventors: Anu Sharma, Gurugram (IN); Sneha Padiyar, Mumbai (IN); Harilakshmi Narayanan, Chennai (IN); Madhumitha Swaminathan Rangarajan, Chennai (IN); Kavitha Yalka, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 135 days.

(21) Appl. No.: 18/420,606

(22) Filed: Jan. 23, 2024

(65) Prior Publication Data

US 2025/0238650 A1 Jul. 24, 2025

(51) Int. Cl.
*G06K 19/073* (2006.01)
*G06K 19/077* (2006.01)

(52) U.S. Cl.
CPC . *G06K 19/07309* (2013.01); *G06K 19/07749* (2013.01)

(58) Field of Classification Search
CPC ....... G06K 19/07309; G06K 19/07749; G08B 21/22; G08B 21/24
See application file for complete search history.

(56) References Cited

U.S. PATENT DOCUMENTS 7,421,249 B2 9/2008 Ariyoshi et al.
7,669,772 B2 3/2010 Smets et al.
(Continued)

FOREIGN PATENT DOCUMENTS

CN 101410877 B 5/2012
CN 214623709 U 11/2021
(Continued)

OTHER PUBLICATIONS

Anu Sharma, System and method to maintain connectivity with a smart card, U.S. Appl. No. 18/420,530, filed Jan. 23, 2024, pp. 1-39.
(Continued)

*Primary Examiner* — Ryan W Sherwin

(57) ABSTRACT

An apparatus comprises a memory communicatively coupled to a processor. The memory is configured to store smart card feedback configured to provide information associated with a presence of one or more smart cards in a vicinity of the apparatus and one or more ultra-protection operations configured to prevent the one or more smart cards from performing data exchange operations. The processor is configured to receive first smart card feedback from a smart card. The smart card is located in a first environment. The processor is configured to determine location information of the environment, the location information comprises multiple boundaries of the environment, retrieve multiple catalogued interactions associated with the location information, and determine whether the catalogued interactions comprise adverse impacts. Further, the processor is configured to execute multiple ultra-protection operations at the smart card in response to determining that the catalogued interactions comprise the first plurality of adverse impacts.

20 Claims, 4 Drawing Sheets

(56) References Cited

U.S. PATENT DOCUMENTS

| | | | |
|---|---|---|---|
| 7,731,094 | B2 | 6/2010 | Phillips |
| 7,992,789 | B2 | 8/2011 | Borracci |
| 8,123,135 | B2 | 2/2012 | Phillips |
| 8,266,364 | B2 | 9/2012 | Kuriyama |
| 8,550,360 | B2 | 10/2013 | Sabbah et al. |
| 9,092,713 | B2 | 7/2015 | Tuda |
| 9,411,995 | B2 | 8/2016 | Brumer et al. |
| 10,055,968 | B2 | 8/2018 | Marra et al. |
| 10,628,722 | B2 | 4/2020 | Rodriguez Bravo |
| 11,425,528 | B2 | 8/2022 | de Barros Chapiewski et al. |
| 11,734,979 | B2 | 8/2023 | Cox |
| 2004/0112966 | A1 | 6/2004 | Pangaud |
| 2006/0232398 | A1* | 10/2006 | Nedblake ........... G08B 13/1427 |
| | | | 340/10.51 |
| 2010/0117800 | A1 | 5/2010 | Li et al. |
| 2013/0298200 | A1* | 11/2013 | Cai ....................... G06F 21/305 |
| | | | 726/4 |
| 2015/0073983 | A1* | 3/2015 | Bartenstein .......... G06Q 20/325 |
| | | | 705/41 |
| 2015/0106264 | A1* | 4/2015 | Johnson ................ G07F 19/207 |
| | | | 705/44 |
| 2016/0171361 | A1* | 6/2016 | Chatterton .............. G06F 21/77 |
| | | | 705/41 |
| 2019/0172067 | A1* | 6/2019 | Arora ................. G06Q 20/4016 |
| 2021/0182833 | A1* | 6/2021 | Singh ................... G06K 19/073 |
| 2021/0182853 | A1* | 6/2021 | Camenares ........ G06Q 20/3263 |
| 2022/0351216 | A1* | 11/2022 | Kramme .............. G06Q 20/401 |

FOREIGN PATENT DOCUMENTS

| | | | |
|---|---|---|---|
| KR | 101909179 | B1 | 10/2018 |
| TW | M586389 | U | 11/2019 |

OTHER PUBLICATIONS

Anu Sharma, System and method to dynamically evaluate patterns in smart card operations, U.S. Appl. No. 18/420,567, filed Jan. 23, 2024, pp. 1-38.

* cited by examiner

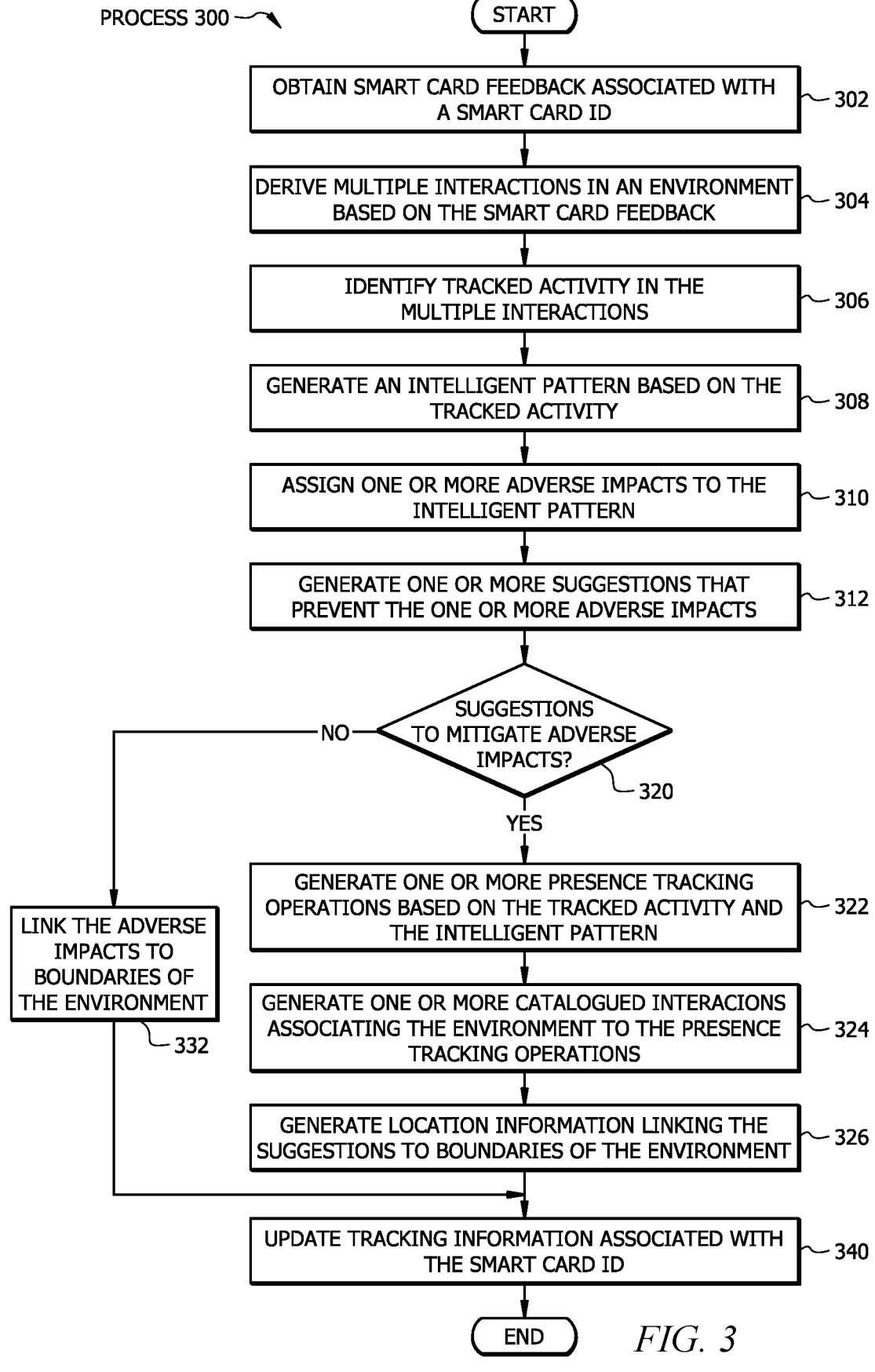

PROCESS 300

START

OBTAIN SMART CARD FEEDBACK ASSOCIATED WITH A SMART CARD ID ～ 302

DERIVE MULTIPLE INTERACTIONS IN AN ENVIRONMENT BASED ON THE SMART CARD FEEDBACK ～ 304

IDENTIFY TRACKED ACTIVITY IN THE MULTIPLE INTERACTIONS ～ 306

GENERATE AN INTELLIGENT PATTERN BASED ON THE TRACKED ACTIVITY ～ 308

ASSIGN ONE OR MORE ADVERSE IMPACTS TO THE INTELLIGENT PATTERN ～ 310

GENERATE ONE OR MORE SUGGESTIONS THAT PREVENT THE ONE OR MORE ADVERSE IMPACTS ～ 312

SUGGESTIONS TO MITIGATE ADVERSE IMPACTS? ～ 320

NO

YES

LINK THE ADVERSE IMPACTS TO BOUNDARIES OF THE ENVIRONMENT ～ 332

GENERATE ONE OR MORE PRESENCE TRACKING OPERATIONS BASED ON THE TRACKED ACTIVITY AND THE INTELLIGENT PATTERN ～ 322

GENERATE ONE OR MORE CATALOGUED INTERACIONS ASSOCIATING THE ENVIRONMENT TO THE PRESENCE TRACKING OPERATIONS ～ 324

GENERATE LOCATION INFORMATION LINKING THE SUGGESTIONS TO BOUNDARIES OF THE ENVIRONMENT ～ 326

UPDATE TRACKING INFORMATION ASSOCIATED WITH THE SMART CARD ID ～ 340

END

FIG. 3

SYSTEM AND METHOD TO DYNAMICALLY MONITOR A SMART CARD

TECHNICAL FIELD

The present disclosure relates generally to operations associated with a smart card, and more specifically to a system and method to dynamically monitor a smart card.

BACKGROUND

A user may have one or more devices that are associated with personal details and/or personal information of the user. The device may be exposed to bad actors when the device is in use or lost. The user may not be able to protect the device against bad actors when the device is in use or when the device is lost. The bad actors may attempt to access and/or modify the personal details and/or personal information of the user. Further, the device may not be capable of determining when bad actors attempt to access and/or modify the personal details and/or personal information of the user.

SUMMARY OF THE DISCLOSURE

In one or more embodiments, a system are configured to dynamically monitor, control, and/or protect operations performed by a smart card. The smart card may be hardware and/or software (e.g., executed by software) configured to enable data exchanges associated with a user. The smart card may be communicatively coupled to a user device associated with the user device. In some embodiments, the smart card may dynamically self-monitor, self-control, and/or self-protect operations performed by the smart card. In particular, the system may be configured to monitor, control, and/or protect operations performed by the smart card. The system may be configured to evaluate any possible adverse impacts associated with a location and/or operation of the smart card. The system may be configured to track multiple interactions associated with the smart card and generate one or more patterns associated with the interactions based on operations and location information associated with the smart card. In this regard, the system may be configured to proactively determine any adverse impacts associated with performing a sequence of interactions in a given location. For example, if the smart card is moved to a specific location, the system may be configured to determine one or more adverse risks associated with moving onto the location based on one or more concurrent interactions. The system may be configured to evaluate sounds received by the smart card. The system may be configured to determine a direction of arrival of any sounds, proximity of the sounds, and motion associated with a source of the sounds. The system may be configured to identify keywords and/or key-sounds in the sounds. The system may determine whether the environment comprises a safe area based on the sounds. A safe area may be at least a portion of the environment associated with fewer adverse risk than one or more other portions of the environment. An unsafe area may be at least a portion of the environment associated with more adverse risk than one or more other portions of the environment. An area may be determined to be safe or unsafe based on whether the area comprises adverse impacts greater than, less than, and/or equal to a number of adverse risks. The number of adverse risks may be dynamically modified or predefined.

In one or more embodiments, the system described herein is integrated into a practical application of dynamically monitoring, controlling, and/or protecting operations performed by a smart card. The system may be configured to evaluate conversations in the environment irrespective of any language and provide continuous and/or periodic feedback for possible adverse impacts in the environment based on the evaluated conversations. In this regard, the system may be configured to dynamically determine whether the environment comprises a safe area. In some embodiments, the system may be configured to determine adverse risks in the environment based on historical sound data previously evaluated for the environment. In this regard, the system may be configured to proactively report whether the smart card is approaching an unsafe area. If an unsafe area is In one or more embodiments, the system are directed to improvements in computer systems. Specifically, the system reduces processor and memory usage in managed servers and/or user devices by dynamically triggering protection operations in the smart card based on whether the environment comprises a safe area or an unsafe area for the smart card. In this regard, the system reduces resource usage by preventing security operations that may be required to retroactively lock and/or protect information in the smart card if the card operates in an unsafe area. Instead, by generating intelligent patterns based on prior and/or historical interactions with the smart card, the system dynamically prevent the smart card from performing data exchange operations in an environment is the environment is determined to be unsafe.

In one or more embodiments, the system and the method may be performed by an apparatus, such as the server. Further, the system may be a data exchange system, which comprises the apparatus. In addition, the system and the method may be performed as part of a process performed by the apparatus. As a non-limiting example, the apparatus may comprise a memory and a processor communicatively coupled to one another. The memory may be configured to store smart card feedback configured to provide information associated with a presence of one or more smart cards in a vicinity of the apparatus and one or more ultra-protection operations configured to prevent the one or more smart cards from performing data exchange operations. The processor may be configured to receive first smart card feedback from a smart card. The smart card may be located in a first environment. The processor may be configured to determine location information of the environment. The location information may comprise multiple boundaries of the environment. The processor may be configured to retrieve multiple catalogued interactions associated with the location information and determine whether the catalogued interactions comprise adverse impacts. Further, the processor may be configured to execute multiple ultra-protection operations at the smart card in response to determining that the catalogued interactions comprise the first plurality of adverse impacts.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates an example flowchart of a method to dynamically evaluate patterns in smart card operations in accordance with one or more embodiments.

DETAILED DESCRIPTION

Figure 1:
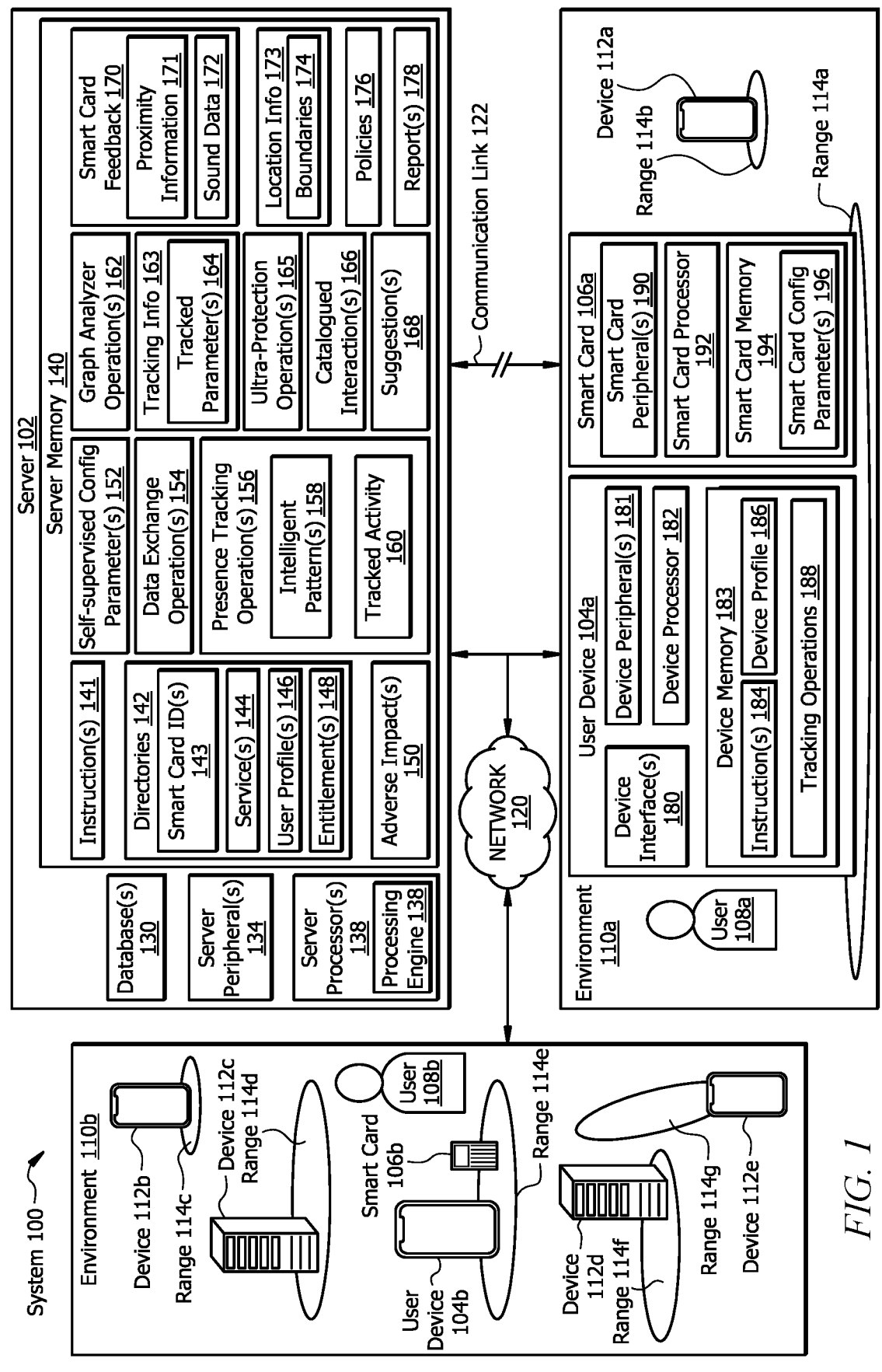
FIG. 1 illustrates a system in accordance with one or more embodiments.
Figure 2:
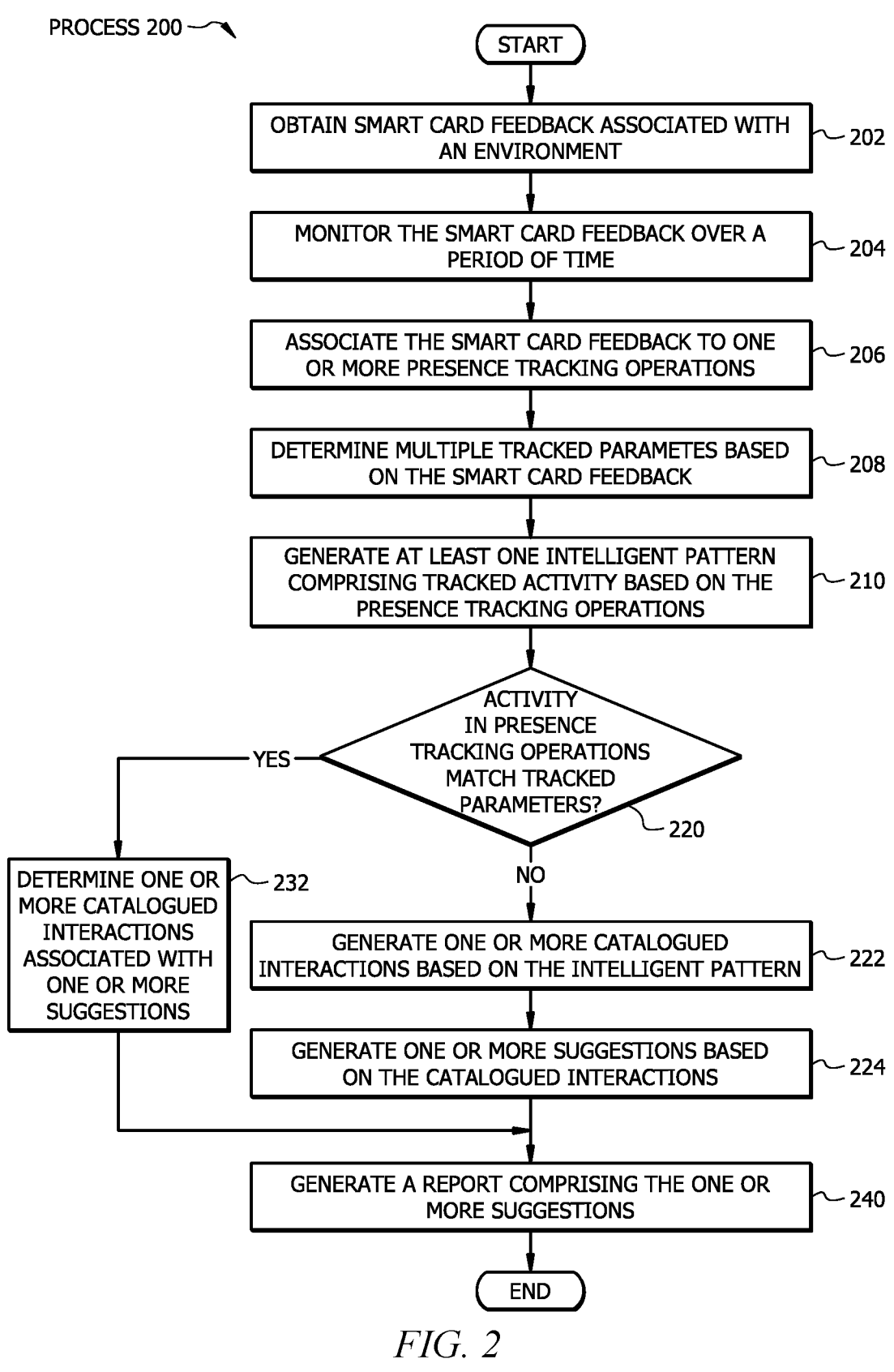
FIG. 2 illustrates an example flowchart of a method to maintain connectivity with a smart card in accordance with one or more embodiments.
Figure 4:
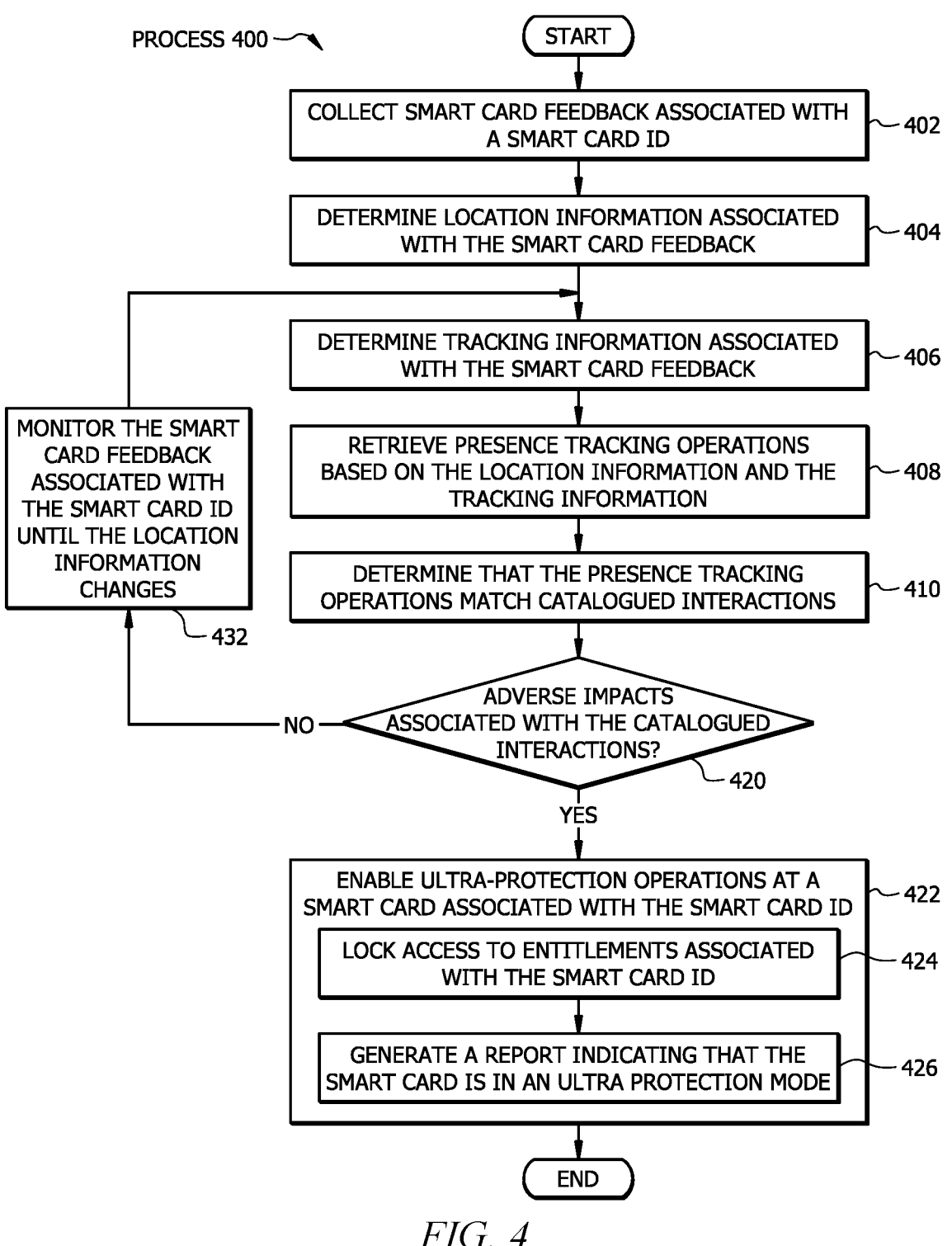
FIG. 4 illustrates an example flowchart of a method to dynamically monitor a smart card in accordance with one or more embodiments.

As described above, this disclosure provides various systems and methods to dynamically monitor, control, and/or protect operations performed by a smart card. FIG. 1 illustrates a system 100 in which a server 102 is configured to establish, monitor, and/or control communication between at least one user device 104 and at least one smart card 106. FIG. 2 illustrates a process 200 performed by the system 100 of FIG. 1 to maintain connectivity with at least one smart card 106. FIG. 3 illustrates a process 300 performed by the system 100 of FIG. 1 to dynamically evaluate patterns in smart card operations. FIG. 4 illustrates a process 400 performed by the system 100 of FIG. 1 to dynamically monitor at least one smart card 106.

System Overview

FIG. 1 illustrates an example system 100, in accordance with one or more embodiments. The system 100 may be configured to dynamically monitor, control, and/or protect operations performed by a server 102 communicatively coupled to at least one user device 104a and a smart card 106a associated with a user 108a in a given environment 110a. The system 100 comprises the environment 110a and an environment 110b (collectively, environments 110). The environment 110a comprises the user device 104a and the smart card 106a communicatively coupled to one another. The user device 104a and the smart card 106a may be configured to track one or more interactions associated with the user 108a. Further, the environment 110a comprises an environment device 112a. The user de 104a and the smart card 106a comprise a combined range 114a. The environment device 112a comprises a range 114b. The range 114a and the range 114b (collectively, ranges 114) are areas of electromagnetic operation in which a device is configured to operate, retrieve information, and/or interact with another device. The environment 110b comprises an environment device 112b with a range 114c, an environment device 112c with a range 114d, a user device 104b communicatively coupled to a smart card 106b with a range 114e, an environment device 112d with a range 114f, and an environment device 112e with a range 114g. the user device 104b and the smart card 106b may be associated with a user device 108b. The user device 104a and the user device 104b (collectively, user devices 104) may be devices associated with the server 102 and configured to monitor, control, and/or perform operations in the smart card 106a and the smart card 106b (collectively, smart cards 106), respectively. The smart cards 106 may be configured to track, monitor, and/or evaluate interactions within corresponding ranges 114 in the environments 110. The devices in the environments 110 may be communicatively coupled to the server 102 via a network 120.

In one or more embodiments, the server 102 may comprise one or more databases 130, one or more server peripherals 134, one or more server processors 136 comprising a processing engine 138, and a server memory 140 communicatively coupled to one another. In some embodiments, the server memory 140 may comprise one or more instructions 141, one or more directories 142 relating one or more smart card identifiers (IDs) 143 with one or more services 144, one or more user profiles 146, and one or more entitlements 148, one or more adverse impacts 150, one or more self-supervised configuration parameters 152, one or more data exchange operations 154, one or more presence tracking operations 156 comprising one or more intelligent patterns 158, and tracked activity 160. Further, the server memory 140 may be configured to store multiple graph analyzer operations 162, tracking information 163 comprising one or more tracked parameters 164, multiple ultra-protection operations, multiple catalogued operations, one or more suggestions 168, smart card feedback 170 comprising proximity information 171 and sound data 172, location information comprising one or more boundaries 174, one or more policies 176, and one or more reports 178.

Referring to the user device 104a a non-limiting example, the user device 104a may comprise at least one device interface 180, one or more device peripherals 181, at least one device processor 182, and at least one device memory comprising instructions 184, at least one device profile 186, and one or more tracking operations 188.

Referring to the smart card 106a a non-limiting example, the smart card 106a may comprise one or more smart card peripherals 190, at least one smart processor 192, and at least one smart card memory 194 comprising multiple smart card configuration parameters.

Security System Components

Server

In one or more embodiments, the server 102 is generally any device or apparatus that is configured to process data and communicate with computing devices (e.g., user devices 104), databases 130, systems, and the like, via one or more interfaces (i.e., user interface or network interface in the server peripherals 134). The server 102 may comprise a server processor 136 that is generally configured to oversee operations of a processing engine 138. The server 102 comprises the server processor 136 communicatively coupled with the server peripherals 134, and a server memory 140. The server 102 may be configured as shown, or in any other configuration.

The server processor 136 comprises one or more processors communicatively coupled to the server memory 140. The server processor 136 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 136 may be a programmable logic device, a microcontroller, a microprocessor, or any suitable combination of the preceding. The one or more server processors 136 are configured to process data and may be implemented in hardware or software executed by hardware. For example, the server processor 136 may be 8-bit, 16-bit, 32-bit, 64-bit or of any other suitable architecture. The server processor 136 may include an arithmetic logic unit (ALU) for performing arithmetic and logic operations, processor registers that supply operands to the ALU and store the results of ALU operations, and a control unit that fetches instructions 141 from the server memory 140 and executes them by directing the coordinated operations of the ALU, registers and other components. In this regard, the one or more server processors 136 are configured to execute various instructions. For example, the one or more server processors 136 are configured to execute the instructions 141 to implement the functions disclosed herein, such as some or all of those described with respect to FIGS. 1-4. In some embodiments, the functions described herein are implemented using logic units, FPGAs, ASICs, DSPs, or any other suitable hardware or electronic circuitry.

In one or more embodiments, the server peripherals 134 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server peripherals 134 may be configured to support any suitable type of communication protocol as would be appreciated by one of ordinary skill in the art.

In one or more embodiments, the server peripherals 134 may be configured to enable wired and/or wireless communications. The server peripherals 134 may be configured to communicate data between the server 102 and other user devices 104, network devices, systems, or domain(s) via the network 120. For example, the server peripherals 134 may comprise a network interface that comprises a WIFI interface, a LAN interface, a WAN interface, a modem, a switch, or a router. The server processor 136 may be configured to send and receive data using the server peripherals 134. The server peripherals 134 may be configured to use any suitable type of communication protocol.

In some embodiments, the server processor 136 may be any combination of a processing accelerator, signal processing circuitry (e.g., including filters, mixers, oscillators, amplifiers, and the like), or digital processing circuitry (e.g., for digital modulation as well as other digital processing). For example, the server processor 136 may be configured to allocate power, processing, and memory resources to monitor and/or control communications and/or operations performed with at least one smart card.

In one or more embodiments, the server processor 136 is configured to create, analyze, manage, and update the one or more directories 142, one or more of the adverse impacts 150, one or more of the self-supervised configuration parameters 152, the tracking information 163, the one or more catalogued interactions 166, the one or more suggestions 168, the location information 173, and/or the one or more policies 176. The server processor 136 may be configured to communicate with the one or more smart cards 106 via the server peripherals 134 and the network 120. The server processor 136 may be configured to perform one or more of the operations described below in reference to FIGS. 2-4. In some embodiments, the server processor 136 may be configured to execute one or more of the data exchange operations 154, the one or more presence tracking operations 156, the one or more of the graph analyzer operations 162, and/or the one or more of the ultra-protection operations 165.

The server memory 140 may be volatile or non-volatile and may comprise a read-only memory (ROM), random-access memory (RAM), ternary content-addressable memory (TCAM), dynamic random-access memory (DRAM), and static random-access memory (SRAM). The server memory 140 may be implemented using one or more disks, tape drives, solid-state drives, and/or the like. The server memory 140 is operable to store the one or more instructions 141, one or more directories 142 relating one or more smart card IDs 143 with one or more services 144, one or more user profiles 146, and one or more entitlements 148, one or more adverse impacts 150, one or more self-supervised configuration parameters 152, one or more data exchange operations 154, one or more presence tracking operations 156 comprising one or more intelligent patterns 158, and tracked activity 160. Further, the server memory 140 may be configured to store multiple graph analyzer operations 162, tracking information 163 comprising one or more tracked parameters 164, multiple ultra-protection operations, multiple catalogued operations, one or more suggestions 168, smart card feedback 170 comprising proximity information 171 and sound data 172, location information comprising one or more boundaries 174, one or more policies 176, and one or more reports 178. The instructions 141 may comprise any suitable set of instructions, logic, rules, or code operable to execute the server processor 136.

The directories 142 may comprise the one or more smart card IDs 143, the one or more services 144, the one or more user profiles 146, and the one or more entitlements 148. In one or more embodiments, the smart card IDs 143 may be identifiers that provide a reference number to each of the smart cards 106 associated with the server 102. The smart card ID 143 indicates one or more entitlements 148 corresponding to one or more services 144 associated with a given user profile 146. The user profiles 146 may comprise multiple profiles for users (e.g., user 108). Each user profiles 146 may comprise one or more entitlements 148. As described above, the entitlements 148 may indicate that a given user is allowed to access one or more network resources associated with the services 144 in accordance with one or more policies 176. The entitlements 148 may indicate that a given user is allowed to perform one or more operations in the network 120 (e.g., access a specific website on the Internet). To secure or protect operations of the user devices 104 from bad actors, the entitlements 148 may be assigned to a given user profiles 146 in accordance with the self-supervised configuration parameters 152, which may provide guidance parameters to the use of the entitlements 148 based at least upon corresponding policies 176. The smart card IDs 143 may be one or more alphanumeric data strings.

The one or more adverse impacts 150 may be one or more values configured to provide indicators of possible adverse changes to the surroundings of a given smart card 106. The adverse impacts 150 and the suggestions 168 may be determined as results of the one or more presence tracking operations 156, the graph analyzer operations 162, and/or the catalogues interactions 166. The adverse impacts 150 may be generated along the suggestions 168. The suggestions 168 may be one or more possible operations configured to mitigate, reduce, and/or eliminate the adverse impacts 150. In one or more embodiments, the adverse impacts 150 are recommendations presented to the server 102 and/or the user device 104 based on the one or more presence tracking operations 156, the graph analyzer operations 162, and/or the catalogues interactions 166. The adverse impacts 150 may comprise one or more warning commands indicating a potential exposure of resources associated with the one or more entitlements 148. In some embodiments, the suggestions 168 are recommendations presented to the server 102 and/or the user devices 104 based on the one or more presence tracking operations 156, the graph analyzer operations 162, and/or the catalogues interactions 166. The suggestions 168 may comprise one or more dynamic configuration commands configured to modify the one or more entitlements 148 for a given smart card ID 143 and or a given user profile 146.

The self-supervised configuration parameters 152 may be one or more indicators configured to provide information associated with one or more operations of the smart cards 106. The server processor 136 may be configured to generate the one or more self-supervised configuration parameters 152 based on smart card feedback 170. In this regard, the self-supervised configuration parameters 152 may be information indicating modifications and/or assignments of resources in the smart cards 106. The self-supervised configuration parameters 152 may be replaced, updated, and/or modified dynamically. The self-supervised configuration parameters 152 may be replaced, updated, and/or modified periodically.

The self-supervised configuration parameters 152 may comprise results of one or more operations of the processing engine 138 configured to perform as a self-supervised cognitive risk detection engine (SCRDE) that retrieves and analyzes smart card feedback 170. The SCRDE may be configured to analyze proximity information 171 and/or sound data 172 collected and/or identified by a given smart card 106. The SCRDE may be configured to identify audio in the surroundings of a given smart card 106. The SCRDE may be configured to study historical occurrences and guidance of the smart cards 106. In some embodiments, the SCRDE may be a conglomerate of a Risk Tracker Module (RTM) and a dynamic user graph analysis module model. In this regard, the presence tracking operations 156 are configured to execute the RTM and the dynamic user graph analysis module model configured to generate one or more intelligent patterns 158 based on tracked activity 160 of a given smart card 106 in one or more environments 110. The presence tracking operations 156 may comprise studying and analyzing activity of the given smart card 106. The activity of the smart card 106 may be tracked as tracked activity 160 comprising one or more interactions 166 of the given smart card 106 in a specific location. The tracked activity 160 may be tracked continuously or periodically over time. In some embodiments, the tracked activity 160 may be tracked and/or monitored at every location that the smart card 106 travels. A new location may be any location in which a new electronic device is detected and/or any location after the server 102 determines that the smart card 106 has moved a predefined distance. For example, the smart card 106 may be determined to be at a new location if a new electronic device is identified to reach a neighboring area of the smart card 106 even if the smart card 106 remains at a same geographical location.

In one or more embodiments, the tracked activity 160 may be a digital footprint of the smart card 106 in the one or more environments 110. The digital footprint may comprise one or more interactions of the smart card 106 and/or a user device 104 associated with the smart card 106 with the one or more environments 110. In some embodiments, the presence tracking operations 156 may be configured to perform one or more intelligent patterns 158 that relate one or more interactions of the tracked activity 160. The presence tracking operations 156 may be configured to calculate efficiency percentages of the self-supervised configuration parameters 152 affecting device profile information associated with a given smart card 106 and/or a given user device 104 associated with the smart card 106 based on any adverse impacts 150 for each of interaction in the tracked activity 160 on particular user devices over a period of time.

In one or more embodiments, the graph analyzer operations 162 may be configured to assign one or more adverse impacts 150 for each interaction in the tracked activity 160. Further, the graph analyzer operations 162 may be configured to generate one or more suggestions 168 to reduce, mitigate, and/or eliminate the identified adverse impacts 150. For example, for an interaction in a given intelligent pattern 158 of a smart card 106 comprising exchanging data with an online retailer (e.g., making a purchase), the graph analyzer operations 162 may identify one, some, or all possible adverse impacts 150 and at least one suggestion 168 to prevent the adverse impacts 150.

In one or more embodiments, the data exchange operations 154 may be executed by the server processor 136 configured to enable data objects to be exchanged between the user devices 104 and/or the smart cards 106 based on the self-supervised configuration parameters 152. In one or more embodiments, the data exchange operations 154 may be configured to indicate one or more data objects (e.g., via data object information) to be exchanged between the server 102 and at least one of the user devices 104 and/or the smart cards 106. The data exchange operations 154 may be configured to generate and analyze one or more reports 178. The reports 178 may comprise data indicating warnings and alerts among other information. In some embodiments, the reports 178 may be audio and/or visual signaling presented in the one or more server peripherals 134 and/or the one or more device peripherals 181.

In some embodiments, the tracking information 163 may comprise one or more tracked parameters 164 configured to indicate one or more reference elements to be obtained as the smart card feedback 170. The tracking parameters 164 may be configured to provide areas of knowledge and/or knowledge domains for the smart card 106 and/or a user device 104 associated with the smart card 106 to focus while retrieving specific smart card feedback 170. In some embodiments, in interactions tracked in the tracked activity 160, one or more interactions may be compiled as catalogued interactions 166. The catalogued interactions 166 may be configured as interactions to be examined, processed, and/or analyzed into one or more of the intelligent patterns 158.

In one or more embodiments, the ultra-protection operations 165 may be one or more suggestions 168 configured to restrict one or more operations of the smart card 106. In some embodiments, the ultra-protection operations 165 may be configured to stop any, some, or all data exchange operations 154 if the smart card 106 is determined to be left behind (e.g., the smart card 106 may be considered to be lost based on the smart card feedback 170). In some embodiments, the smart card feedback 170 may comprise proximity information 171 and/or sound data 172 collected by the smart cards 106. The smart card feedback 170 may be provided continuously and/or periodically over time. The proximity information 171 may be data indicating whether any of the devices 112 are in an area surrounding the smart card 106. The sound data 172 may be obtained via an acoustic risk listener doppler model configured with a natural language processing (NPL) that identifies any kind of possible adverse impacts based on input audio related to fraudulent activities or crime within the boundaries 174 of a given location. The sound data 172 may comprise multiple sound data samples. Each sound data sample may comprise a magnitude, a reception direction, and a duration. The proximity information 171 may be configured to indicate a proximity of the sound data samples to a smart card 106 associated with the smart card feedback 170. The proximity information 171 may indicate one or more changes in the proximity of the sound data samples to a smart card 106 associated with the smart card feedback 170 over the period of time.

The location information 173 may be information pertaining to the spatial, geographical, and/or virtual location of the smart card 106 at a given point in time. The spatial location may comprise information indicating changes in the spaces immediately surrounding the smart card 106 and/or the user device 104 associated with the smart card 106. The geographical location may be a position (e.g., altitude and/or latitude) of the smart card 106 and/or the user device 104 associated with the smart card 106 on Earth. The virtual location may be an access point on the network 120 in which the smart card 106 and/or the user device 104 associated with the smart card 106 is in contact. The location information 173 may comprise one or more boundaries 174 to limit any, some, or all of the aforementioned locations.

The boundaries 174 may indicate a radius surrounding a user device 104 associated with the smart card 106. In one example, if the smart card 106 moves out of a given boundary 174 away from the user 108, the server 102 may be configured to determine that the smart card 106 is left behind (e.g., lost) and one or more ultra-protection operations 165 are activated. In another example, if the smart card 106 returns to the given boundary 174 towards the user 108, the server 102 may be configured to determine that the smart card 106 is returned to the user 108 (e.g., returned) and one or more ultra-protection operations 165 are deactivated.

In one or more embodiments, the presence tracking operations 156 may be configured to generate one or more of the intelligent patterns 158 from one or more catalogued interactions 166 in the tracked activity 160 obtained from the smart card feedback 170. The presence tracking operations 156 may be configured to cluster catalogued interactions 166 and evaluate clusters of catalogued interactions 166 over time. The presence tracking operations 156 may be configured to study the catalogued interactions 166 continuously and/or over time. The catalogued interactions 166 may be interactions catalogued in one or more sections, groups, and/or divisions. For example, certain interactions may be catalogued under the title of purchases, while some interactions may be catalogued under the title of driving interactions (e.g., moving quickly and/or changing locations quickly in a vehicle) among others. The server 102 may be configured to preventively detect possible adverse impacts 150 and suggestions 168 based on the intelligent patterns 158. The adverse impacts 150 may be determined based on keywords detected in the sound data 172. In some embodiments, new intelligent patterns 158 may be created to replace existing intelligent patterns 158. In other embodiments, new intelligent patterns 158 may be created to supplement existing intelligent patterns 158.

In one or more embodiments, the server processor 136 may be configured to interpret and transform the self-supervised configuration parameters 152 into structured data sets and subsequently stored as files or tables. The server processor 136 may cleanse, normalize raw data, and derive intermediate data to generate uniform data in terms of encoding, format, and data types. The server processor 136 may execute the instructions 141 to run user queries and advanced analytical tools on the structured data. The data exchange operations 154, the presence tracking operations 156, the graph analyzer operations 162, and the ultra-protection operations 165 may be combined with existing server instructions 141 and/or existing configuration commands. In one or more embodiments, the data exchange operations 154, the presence tracking operations 156, the graph analyzer operations 162, and the ultra-protection operations 165 may be periodically and/or dynamically updated.

The one or more policies 176 may be security configuration commands or regulatory operations predefined by an organization or one or more users 108. In one or more embodiments, the one or more policies 176 may be dynamically defined by the one or more users 108. The one or more policies 176 may be prioritization rules configured to instruct one or more user devices 104 and/or the one or more smart cards 106 to perform one or more operations or perform one or more operations in the system 100 in a specific request. The one or more one or more policies 176 may be predetermined or dynamically assigned by a corresponding user 108 or an organization associated with the user 108.

Network

The network 120 facilitates communication between and amongst the various devices of the system 100. The network 120 may be any suitable network operable to facilitate communication between the server 102, the user devices 104, and the smart cards 106 of the system 100. The network 120 may include any interconnecting system capable of transmitting audio, video, signals, data, data packets (e.g., non-fungible tokens (NFT)), messages, or any combination of the preceding. The network 120 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Device

In one or more embodiments, each of the user devices 104 (e.g., the user devices 104a and 104b) may be any computing device configured to communicate with other devices, such as the server 102, other user devices 104 in the environments 110, databases, and the like in the system 100. Each of the user devices 104 may be configured to perform specific functions described herein and interact with one or more user devices 104a and 104b in the environments 110. Examples of user devices 104 comprise, but are not limited to, a laptop, a computer, a smartphone, a tablet, a smart device, an IoT device, a simulated reality device, an augmented reality device, or any other suitable type of device.

The user devices 104 may be hardware configured to create, transmit, and/or receive information. The user devices 104 may be configured to receive inputs from a user, process the inputs, and generate data information or command information in response. The data information may include documents or files generated using a graphical user interface (GUI). The command information may include input selections/commands triggered by a user using a peripheral component or one or more device peripherals 181 (i.e., a keyboard) or an integrated input system (i.e., a touchscreen displaying the GUI). The user devices 104 may be communicatively coupled to the server 102 via a network connection (i.e., device interface 180 in the server 102). The user devices 104 may transmit and receive data information, command information, or a combination of both to and from the server 102 via the device interface 180. In one or more embodiments, the user devices 104 is configured to exchange data, commands, and signaling with the server 102. In some embodiments, the user devices 104 are configured to trigger the start of one or more tracking operations 188. The user devices 104 may be configured to trigger the smart cards 106 to obtain smart card feedback 170. The user devices 104 may be configured to obtain smart card feedback 170. In one or more embodiments, while FIG. 1 shows the user device 104a, the user device 104b, may comprise less or more user devices 104.

In one or more embodiments, referring to the user device 104a as a non-limiting example of the user devices 104, the user device 104a may comprise one or more device interfaces 180, one or more device peripherals 181, a device processor 182, and a device memory 183. The device interfaces 180 may be any suitable hardware or software (e.g., executed by hardware) to facilitate any suitable type of communication in wireless or wired connections. These connections may comprise, but not be limited to, all or a portion of network connections coupled to an additional user device 104b, the server 102, the Internet, an Intranet, a private network, a public network, a peer-to-peer network, the public switched telephone network, a cellular network, a LAN, a MAN, a WAN, and a satellite network. The device interfaces 180 may be configured to support any suitable type of communication protocol.

In one or more embodiments, the one or more device peripherals 181 may comprise audio devices (e.g., speaker, microphones, and the like), input devices (e.g., keyboard, mouse, and the like), or any suitable electronic component that may provide a modifying or triggering input to the user device 104a. For example, the one or more device peripherals 181 may be speakers configured to release audio signals (e.g., voice signals or commands) during media playback operations. In another example, the one or more device peripherals 181 may be microphones configured to capture audio signals from the user 108a. In one or more embodiments, the one or more device peripherals 181 may be configured to operate continuously, at predetermined time periods or intervals, or on-demand.

The device processor 182 may comprise one or more processors communicatively coupled to and in signal communication with the device interfaces 180, the device peripherals 181, and the device memory 183. The device processor 182 is any electronic circuitry, including, but not limited to, state machines, one or more CPU chips, logic units, cores (e.g., a multi-core processor), FPGAs, ASICs, or DSPs. The device processor 182 may be a programmable logic device, a microcontroller, a microprocessor, or any suitable combination of the preceding. The one or more processors in the device processor 182 are configured to process data and may be implemented in hardware or software executed by hardware. For example, the device processor 182 may be an 8-bit, a 16-bit, a 32-bit, a 64-bit, or any other suitable architecture. The device processor 182 comprises an ALU to perform arithmetic and logic operations, processor registers that supply operands to the ALU, and store the results of ALU operations, and a control unit that fetches software instructions such as device instructions 184 from the device memory 183 and executes the device instructions 184 by directing the coordinated operations of the ALU, registers, and other components via a device processing engine (not shown). The device processor 182 may be configured to execute various instructions. For example, the device processor 182 may be configured to execute the device instructions 184 to implement functions or perform operations disclosed herein, such as some or all of those described with respect to FIGS. 1-4. In some embodiments, the functions described herein are implemented using logic units, FPGAs, ASICs, DSPs, or any other suitable hardware or electronic circuitry.

In one or more embodiments, the device profile 186 comprises information associated with a corresponding user device 104. In the example of FIG. 1, the device profile 186 comprises data associated with the smart card 106a and/or the user 108a. The tracking operations 188 may be configured to track one or more of the physical phenomena surrounding the user device 104a and/or the smart card 106a. The user device 104a and/or the smart card 106a may be configured to comprise the range 114a. The range 114 may be delimited by a radius configured as one of the boundaries 174.

The user device 104a and/or the smart card 106a may be surrounded by one or more devices 112 comprising corresponding ranges 114. The ranges 114 may be electromagnetic footprints associated with a given device 112. A change on the ranges 114 of the devices 112 may indicate that a given device 112 is attempting to reach one of the user devices 104. For example, the user device 104b and the smart card 106b may be configured to determine that the device 112e if the range 114g is determined to attempt to reach and/or interfere with the range 114e.

Smart Card

In one or more embodiments, the smart cards 106 may be hardware and/or software executed by software configured to exchange information with one or more access points in the network 120. The smart cards 106 may be configured to perform one or more of the data exchange operations 154 based on one or more entitlements 148 for the one or more services 144.

Referring to the smart card 106a as a non-limiting example, the smart card 106a comprises the smart card peripherals 190, the smart card processor 192, and the smart card memory 194 comprising the smart card configuration parameters 196. The smart card peripherals 190 may be hardware configured to interface with the user device 104a, one of the devices 112, and/or the server 102. For example, the smart card peripherals 190 may comprise magnetic strip, antennas to share signaling and/or commands, and/or written words that may be seeing to obtain information among others. The smart card peripherals 190 may be configured as one or more of the device interfaces 180 in the user device 104a. The smart card processor 192 may be configured to perform one or more of the operations performed by the device processor 182 in the user device 104a. The smart card memory 194 may be configured to store one or more of the data stored in the user device 104a. In this regard, the smart card configuration parameters 196 may be one or more of the parameters indicated to be tracked and converted into smart card feedback 170.

Example Processes

FIGS. 2-4 illustrate examples flowcharts of a process 200, a process 300, and a process 400, respectively. The process 200 may be configured to maintain connectivity with a smart card 106, in accordance with one or more embodiments. The process 300 may be configured to dynamically evaluate intelligent patterns 158 in smart card operations, in accordance with one or more embodiments. The process 400 may be configured to dynamically monitor a smart card 105, in accordance with one or more embodiments. Modifications, additions, or omissions may be made to the process 200, the process 300, and the process 400. The process 200, the process 300, and the process 400 may comprise more, fewer, or other operations than those shown in FIGS. 2-4, respectively. For example, operations may be performed in parallel or in any suitable order. While at times discussed as the server 102, the user devices 104, the smart cards 106, or components of any of thereof performing operations described in operations 202-240 in the process 200, operations 302-340 in the process 300, and operations 402-426 in the process 400, any suitable system or components of the system 100 may perform one or more operations of the process 200, the process 300, and/or the process 400. For example, one or more operations of the process 200 may be implemented, at least in part, in the form of instructions 141 of FIG. 1, stored on non-transitory, tangible, machine-readable media (e.g., non-transitory computer readable medium such as the server memory 140 of FIG. 1) that when run by one or more processors (e.g., the server processor 136 of FIG. 1) may cause the one or more processors to perform operations described in operations 202-240.

Process to Maintain Connectivity with a Smart Card

FIG. 2 illustrates an example flowchart of a process 200 configured to maintain connectivity with a smart card, in accordance with one or more embodiments. In one or more embodiments, the process 200 is configured to perform one or more presence tracking operations 156 to track a presence of a user 108 in relation to a smart card 106 and/or a user device 104 associated with the smart card 106 continuously and/or periodically over time. The smart card 106 and the user device 104 may be configured to generate a report 178 comprising a safety warning upon determining that the user 108 is not in a vicinity of the smart card 106. The user device 104 may be configured to monitor sounds (e.g., sound data 172) associated with the user 108 tracked by the smart card 106 while the user 108 carries the smart card 106. In some embodiments, the smart card 106 enables sound awareness and keyword tracking as the smart card 106 perceives sounds directed towards the user 108. The smart card feedback 170 provided from the smart card 106 is processed through the server processor 136 and/or the device processor 182 operating a self-supervised cognitive fault detection engine (SCFDE) and an intelligent pattern generation engine. The SCFDE may and an intelligent pattern generation engine may be performed as part of the presence tracking operations 156 and the graph analyzer operations 162. The presence tracking operations 156 and the graph analyzer operations 162 may be configured to study historical patterns of the smart card feedback 170 (e.g., of the proximity information 171 and/or sound data 172 collected by the user device 104 and/or the smart card 106. For example, the presence tracking operations 156 and the graph analyzer operations 162 may be configured to determine a nature of events associated with faults in the sound data 172 collected. The nature of these events may be constantly updated as the user 108 moves from one location to another or changes catalogues interactions 166 in a same area.

The process 200 starts at operation 202, where the user device 104 obtains smart card feedback 170 associated with an environment 110. The user device 104 may receive smart card feedback 170 from a smart card 106 configured to sense physical phenomena in the environment 110. At operation 204, the user device 104 is configured to monitor the smart card feedback 170 over a period of time. At operation 206, the user device 104 may be configured to associate the smart card feedback 170 to one or more presence tracking operations 156. The user device 104 may be configured to perform the presence tracking operations 156 based on the smart card feedback 170. As described above, the presence tracking operations 156 may comprise structuring the smart card feedback 170 for study and/or analysis. At operation 208, the user device 104 is configured to determine multiple tracked parameters 164 based on the smart card feedback 170. The user device 104 identifies tracked activity 160 in the smart card feedback 170. At operation 210, the user device 104 is configured to generate at least one intelligent pattern 158 comprising tracked activity 160 based on the presence tracking operations 156. The user device 104 may be configured to generate the intelligent pattern 158 based at least in part upon the tracked activity 160. At operation 220, the user device 104 is configured to determine whether the tracked activity 160 in the presence tracking operations 156 matches the tracked parameters 164. The user device 104 determines whether the tracked activity 160 was collected in accordance with the tracked parameters 164. In one example, a sound tracked in the environment identified to belong to an animal may not match tracked parameters 164 indicating guidelines to track electromagnetic disturbances in the environment 110. In another example, a sound tracked in the environment identified to belong to a person that is not the user 108 may match tracked parameters 164 indicating guidelines to track interactions with people in the environment 110. If the user device 104 determines that the tracked activity 160 in the presence tracking operations 156 does not match the tracked parameters 164 (e.g., NO), the process 200 proceeds to operation 222. If the user device 104 determines that the tracked activity 160 in the presence tracking operations 156 match the tracked parameters 164 (e.g., YES), the process 200 proceeds to operation 232.

At operation 222, the user device 104 is configured to generate one or more catalogued interactions 166 based on the intelligent pattern 158. The user device 104 may be configured to associate location information 173 of the environment 110 to the intelligent pattern 158. The location information 173 may comprise multiple boundaries 174 configured to indicate limits of the environment 110. At operation 224, the user device 104 is configured to generate one or more suggestions 168 based on the catalogued interactions 166. The user device 104 may generate a report 178 indicating one or more presence tracking operations 156 based at least in part upon the intelligent pattern 158. The presence tracking operations 156 may be configured to indicate one or more relations between the tracked activity 160 within the boundaries 174. At operation 232, the user device 104 is configured to determine one or more catalogued interactions 166 associated with one or more suggestions 168. The user device 104 may be configured to. The process 200 may end at operation 240, where the user device 104 may be configured to generate a report 178 comprising the one or more suggestions 168.

Process to Dynamically Evaluate Patterns in Smart Card Operations

FIG. 3 illustrates an example flowchart of a process 300 to dynamically evaluate patterns in smart card operations, in accordance with one or more embodiments. In one or more embodiments, the process 300 is configured to perform one or more presence tracking operations 156 to track different aspects of a behavior of a smart card 106 over a period of time and determine a percentage of efficiency associated with operations involving the smart card 106. The server 102 may be configured to evaluate smart card feedback 170 associated with a user device 104 and/or a smart card 106 of a user 108. Further, the server 102 is configured to perform one or more graph analyzer operations 162 in which the user 108 is treated as a node and all interactions with the user 108 are treated as extension of the user node. The interactions are catalogued into the catalogued interactions 166 and evaluated in association to the smart card 106 involvement and behavioral patterns of the user 108. The interactions are catalogued and potential adverse impacts 150 are associated with these interactions.

The process 300 proceeds to operation 302, where the server 102 obtain smart card feedback 170 associated with a smart card identifier (ID) 143. The smart card ID 143 may reference one or more smart cards 106 associated with a corresponding user 108. At operation 304, the server 102 is configured to derive multiple interactions in an environment 110 based on the smart card feedback 170. At operation 306, the server 102 is configured to identify tracked activity 160 in the multiple interactions. The tracked activity 160 comprising interactions in the smart card feedback 170 that are tracked in response to matching criteria set in the tracked parameters 164. At operation 308, the server 102 is configured to generate an intelligent pattern 158 based on the tracked activity 160. At operation 310, the server 102 is configured to assign one or more adverse impacts 150 to the intelligent pattern 158. At operation 312, the server 102 is configured to generate one or more suggestions 168 that may prevent the one or more adverse impacts 150. The server 102 may be configured to generate one or more suggestions 168 configured to mitigate the adverse impacts 150. At operation 320, the server 102 is configured to determine whether the suggestions 168 mitigate the assigned adverse impacts 150. If the server 102 determines that the suggestions 168 do not mitigate the assigned adverse impacts (e.g., YES), the process 300 proceeds to operation 322. If the server 102 determine that the suggestions 168 do not mitigate the assigned adverse impacts (e.g., NO), the process 300 proceeds to operation 332.

At operation 322, the server 102 is configured to generate one or more presence tracking operations 156 based on the tracked activity 160 and the intelligent pattern 158. In response to determining that the suggestions 168 mitigate the adverse impacts 150, the server 102 is configured to generate a report 178 relating the suggestions 168 to the environment 110. At operation 324, the server 102 is configured to generate one or more catalogued interactions 166 associating the environment 110 to the presence tracking operations 156. At operation 326, the server 102 is configured to generate location information 173 linking the suggestions 168 to boundaries 174 of the environment 110. At operation 332, the server 102 may be configured to link the adverse impacts 150 to the boundaries 174 of the environment 110. In response to determining that the suggestions 168 do not mitigate the adverse impacts 15, the server 102 may be configured to generate a report 178 relating the adverse impacts 150 to the environment 110. The process 300 may end at operation 340, where the server 102 may be configured to update tracking information 163 associated with the smart card ID 143.

Process to Dynamically Monitor a Smart Card

FIG. 4 illustrates an example flowchart of a process 400 to dynamically monitor a smart card, in accordance with one or more embodiments. In one or more embodiments, the process 400 may be configured to monitor, identify, and prevent issues associated with a smart card 106. The server 102 may be configured to evaluate smart card feedback collected via the user device 104 and/or the smart card 106 to predict possible triggers that activate one or more ultra-protection operations 165 in the smart card 106. In particular, the server may be configured to continuously learn location information 173 of the smart card 106, stay alert on the potential factors related to safety of the smart card 106, set boundaries 174 from the perspective of the smart card 106 on the environment 110 based on current and historical catalogued interactions 166 in the environment 110; trigger the one or more ultra-protection operations 165 when key factors impacting threat are met, and communicate status and location information 173 to the user 108 informing the user 108 of possible threats in the environment 110.

The process 400 proceeds to operation 402, where the server 102 collect smart card feedback 170 associated with a smart card identifier (ID) 143. The server 102 receives smart card feedback 170 from a smart card 106 and/or a user device 104 associated with the smart card 106 in an environment 110. At operation 404, the server 102 is configured to determine location information 173 associated with the smart card feedback 170. The location information 173 may comprise one or more boundaries 174 of the environment 110. At operation 406, the server 102 is configured to determine tracking information 163 associated with the smart card feedback 170. At operation 408, the server 102 is configured to retrieve presence tracking operations 156 based on the location information 173 and the tracking information 163. The server 102 may retrieve catalogued interactions 166 associated with the location information 173. At operation 410, the server 102 is configured to determine that the presence tracking operations 156 match the catalogued interactions 166. The server 102 may be configured to determine whether the existing intelligent patterns 158 comprise the catalogued interactions 166. At operation 420, the server 102 is configured to determine whether there are adverse impacts 150 associated with the catalogued interactions 166. If the server 102 determines that there are adverse impacts 150 associated with the catalogued interactions 166 (e.g., YES), the process 400 proceeds to operation 422. If the server 102 determines that there are not adverse impacts 150 associated with the catalogued interactions 166 (e.g., NO), the process 400 proceeds to operation 432. At operation 432, the server 102 may be configured to monitor the smart card feedback 170 associated with the smart card ID 143 until the location information 173 changes.

At operation 422, the server 102 is configured to enable ultra-protection operations 165 at the smart card 106 associated with the smart card ID 143. In response to determining that the catalogued interactions 166 comprise the adverse impacts 150, the server 102 may be configured to execute the ultra-protection operations 165 at the smart card. In some embodiments, the server 102 At operation 424, the server 102 is configured to lock access to entitlements 148 associated with the smart card ID 143. Further, the server 102 may lock access to one or more entitlements 148 associated with a user profile 146 of the smart card 106. The process 400 may end at operation 426, where the server 102 may be configured to generate a report 178 (e.g., an alert) indicating that the smart card 106 is in an ultra-protection mode. As described above, the server 102 may be configured to continue tracking operations and movement at the smart card 106 is possible. In some embodiments, the server 102 may request for the ultra-protection operations 165 to be stopped if the adverse impacts 150 are mitigated in the environment 110 or the smart card 106 moves to a new environment that does not comprise the adverse impacts 150.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
   a memory configured to store:
      smart card feedback configured to provide information associated with a presence of a smart card in a vicinity of a user device; and
      a plurality of ultra-protection operations configured to prevent the smart card from performing data exchange operations; and
   a processor communicatively coupled to the memory and configured to:
      receive first smart card feedback from the smart card, the smart card being collocated in a first environment with the user device;
      determine first location information of the first environment, wherein:
         the first location information comprises a first plurality of boundaries of the first environment; and
         the first plurality of boundaries relates to a radius surrounding the user device;
      retrieve a first plurality of catalogued interactions associated with the first location information;
      determine whether the first plurality of catalogued interactions comprise a first plurality of adverse impacts; and
      in response to determining that the first plurality of catalogued interactions comprise the first plurality of adverse impacts, execute the plurality of ultra-protection operations at the smart card.

2. The apparatus of claim 1, wherein the first smart card feedback comprises:
   sound data comprising a plurality of sound data samples, each sound data sample comprising a magnitude, a reception direction, and a duration; and
   proximity information indicating a proximity of the plurality of sound data samples to the smart card.

3. The apparatus of claim 2, wherein the proximity information further indicates a plurality of changes in the proximity of the plurality of sound data samples to the smart card over a period of time.

4. The apparatus of claim 1, wherein, in conjunction with the plurality of ultra-protection operations, the processor is further configured to:
   lock access to one or more entitlements associated with the smart card;
   generate a report indicating that the smart card is in an ultra-protection mode; and
   transmit the report to the user device associated with the smart card.

5. The apparatus of claim 1, wherein the processor is further configured to:
   receive second smart card feedback from the smart card, the smart card being located in a second environment;
   determine second location information of the second environment, the second location information comprising a second plurality of boundaries of the second environment;
   retrieve a second plurality of catalogued interactions associated with the second location information;
   determine whether the second plurality of catalogued interactions comprises a second plurality of adverse impacts; and
   in response to determining that the second plurality of catalogued interactions comprises the second plurality of adverse impacts, maintain execution of the plurality of ultra-protection operations at the smart card.

6. The apparatus of claim 1, wherein the processor is further configured to:
   receive second smart card feedback from the smart card, the smart card being located in a second environment;
   determine second location information of the second environment, the second location information comprising a second plurality of boundaries of the second environment;
   retrieve a second plurality of catalogued interactions associated with the second location information;
   determine whether the second plurality of catalogued interactions comprises a first plurality of suggestions; and
   in response to determining that the second plurality of catalogued interactions comprises the first plurality of suggestions, stop execution of the plurality of ultra-protection operations at the smart card.

7. The apparatus of claim 1, wherein the first smart card feedback is received from the user device paired with the smart card.

8. A method, comprising:
   receiving first smart card feedback from a smart card, the smart card being collocated in a first environment with a user device;
   determining first location information of the first environment, wherein:
      the first location information comprises a first plurality of boundaries of the first environment; and
      the first plurality of boundaries relates to a radius surrounding the user device;
   retrieving a first plurality of catalogued interactions associated with the first location information;
   determining whether the first plurality of catalogued interactions comprise a first plurality of adverse impacts; and
   in response to determining that the first plurality of catalogued interactions comprise the first plurality of adverse impacts, executing a plurality of ultra-protection operations at the smart card, the plurality of ultra-protection operations being configured to prevent the smart card from performing data exchange operations.

9. The method of claim 8, wherein the first smart card feedback comprises:
   sound data comprising a plurality of sound data samples, each sound data sample comprising a magnitude, a reception direction, and a duration; and
   proximity information indicating a proximity of the plurality of sound data samples to the smart card.

10. The method of claim 9, wherein the proximity information further indicates a plurality of changes in the proximity of the plurality of sound data samples to the smart card over a period of time.

11. The method of claim 8, further comprising:

in conjunction with the plurality of ultra-protection operations, locking access to one or more entitlements associated with the smart card;

generating a report indicating that the smart card is in an ultra-protection mode; and transmitting the report to the user device associated with the smart card.

12. The method of claim 8, further comprising:

receiving second smart card feedback from the smart card, the smart card being located in a second environment;

determining second location information of the second environment, the second location information comprising a second plurality of boundaries of the second environment;

retrieving a second plurality of catalogued interactions associated with the second location information;

determining whether the second plurality of catalogued interactions comprises a second plurality of adverse impacts; and in response to determining that the second plurality of catalogued interactions comprises the second plurality of adverse impacts, maintaining execution of the plurality of ultra-protection operations at the smart card.

13. The method of claim 8, further comprising:

receiving second smart card feedback from the smart card, the smart card being located in a second environment;

determining second location information of the second environment, the second location information comprising a second plurality of boundaries of the second environment;

retrieving a second plurality of catalogued interactions associated with the second location information;

determining whether the second plurality of catalogued interactions comprises a first plurality of suggestions; and in response to determining that the second plurality of catalogued interactions comprises the first plurality of suggestions, stopping execution of the plurality of ultra-protection operations at the smart card.

14. The method of claim 8, wherein the first smart card feedback is received from the user device paired with the smart card.

15. A non-transitory computer readable medium storing instructions that when executed by a processor cause the processor to:

receive first smart card feedback from a smart card, the smart card being collocated in a first environment with a user device;

determine first location information of the first environment, wherein:

the first location information comprises a first plurality of boundaries of the first environment; and the first plurality of boundaries relates to a radius surrounding the user device;

retrieve a first plurality of catalogued interactions associated with the first location information;

determine whether the first plurality of catalogued interactions comprise a first plurality of adverse impacts; and in response to determining that the first plurality of catalogued interactions comprise the first plurality of adverse impacts, execute a plurality of ultra-protection operations at the smart card, the plurality of ultra-protection operations being configured to prevent the smart card from performing data exchange operations.

16. The non-transitory computer readable medium of claim 15, wherein the first smart card feedback comprises:

sound data comprising a plurality of sound data samples, each sound data sample comprising a magnitude, a reception direction, and a duration; and proximity information indicating a proximity of the plurality of sound data samples to the smart card.

17. The non-transitory computer readable medium of claim 16, wherein the proximity information further indicates a plurality of changes in the proximity of the plurality of sound data samples to the smart card over a period of time.

18. The non-transitory computer readable medium of claim 15, wherein the instructions further cause the processor to:

in conjunction with the plurality of ultra-protection operations, lock access to one or more entitlements associated with the smart card;

generate a report indicating that the smart card is in an ultra-protection mode; and transmit the report to the user device associated with the smart card.

19. The non-transitory computer readable medium of claim 15, wherein the instructions further cause the processor to:

receive second smart card feedback from the smart card, the smart card being located in a second environment;

determine second location information of the second environment, the second location information comprising a second plurality of boundaries of the second environment;

retrieve a second plurality of catalogued interactions associated with the second location information;

determine whether the second plurality of catalogued interactions comprises a second plurality of adverse impacts; and in response to determining that the second plurality of catalogued interactions comprises the second plurality of adverse impacts, maintain execution of the plurality of ultra-protection operations at the smart card.

20. The non-transitory computer readable medium of claim 15, wherein the instructions further cause the processor to:

receive second smart card feedback from the smart card, the smart card being located in a second environment;

determine second location information of the second environment, the second location information comprising a second plurality of boundaries of the second environment;

retrieve a second plurality of catalogued interactions associated with the second location information;

determine whether the second plurality of catalogued interactions comprises a first plurality of suggestions; and in response to determining that the second plurality of catalogued interactions comprises the first plurality of suggestions, stop execution of the plurality of ultra-protection operations at the smart card.

* * * * *